Patented Feb. 3, 1931

1,791,069

UNITED STATES PATENT OFFICE

HERMAN D. WENDT, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA

PROCESS OF PRODUCING BUTTER

No Drawing.   Application filed February 4, 1930. Serial No. 425,904.

The invention relates to improvements in the process of producing butter.

An object of the invention is to provide a process whereby butter can be produced directly from milk or cream with the milk fat in its original emulsion as the dispersed phase without churning.

It has heretofore been customary to collect and treat quantities of milk for a predetermined period of time to permit the butter fat particles contained therein to separate from the remaining portions of the milk vehicle; and thereafter to strenuously agitate this mixture by a procedure known as "churning," whereby the butter fat globules contained in the mixture are caused to come into contact with one another and to coalesce and form successively larger granules known commercially as clusters of butter.

Several theories have been presented as to the actual form of milk, under one of which the butter fat globules are assumed to be merely the dispersed phase in the milk emulsion, in which the remaining liquids are the continuous phase; and according to this theory the separation of the butter fat globules one from another is maintained by certain phenomena of surface tensions, etc. By another theory, each individual butter fat globule is surrounded by a microscopically thin envelope comprising an albuminous material of the milk, and is thus protected and separated from its neighbors when it comes into approximate contact with them. In either event, however, the butter fat globules are present as the dispersed phase in the lacteal emulsion, in which the milk liquids are the continuous phase.

According to the present invention, and as set forth in my co-pending application Serial No. 425,903, filed on the same date herewith, I have set forth a process of producing a cream of high percentage of butter fat by a centrifugal separation from whole milk. According to the presently described features, the high fat percentage cream thus obtained is subjected in its finished and plastic condition to pressure preferably by a mechanical kneading whereby the individual butter fat globules theretofore maintained as the dispersed phase, are brought into closer approximation by the breaking down of the thin films of the liquid phase vehicle located between them, so that they coalesce and form butter. This action occurs definitely and easily in practice; and is not concerned with either of the theories of constitution of milk as set forth above, and is accomplished directly without churning.

In the preferred form of the process, the milk is treated to a centrifugal action whereby the cream containing from eighteen to forty percent of butter fat is removed therefrom. The cream may be produced from the milk by other methods. This cream is still a liquid and may be handled as such. After the cream product has been thus obtained, it is fore-warmed or heated to a temperature sufficient to render the milk fat therein contained, fluid. The product is then immediately passed into a centrifugal machine operated at less capacity and substantially higher speed, producing increased centrifugal force over that required in the first separation of the cream from milk in the ordinary way. This subjecting of the heated cream product to this second stage centrifugal separation results in a plastic product when cooled to below the melting point of the butter fat contained therein. This plastic product contains in excess of sixty-five percent butter fat and without the coalescing of the milk fat globules to form particles of larger dimensions. The liquid vehicle in the plastic product remains as a film closely coating the butter fat globules and holding the globules of the butter fat in the dispersed phase. This plastic "super-cream" product is capable of other uses than for producing butter without churning, and the process of making such plastic product, and the product itself, form the subject-matter of my co-pending application which has been referred to above. The product thus obtained may contain from sixty-five percent to eighty percent butter fat, the remaining ingredients being mostly the liquid of the whole milk, with very small quantities of the solids other than butter fat contained in the whole milk. Thus, I have found that the thirty-five percent cream finally obtained has the following constituents:

| | Per cent |
|---|---|
| Butter fat | 35 |
| Solids other than butter fat | 6 |
| Liquids | 59 |

Following the second centrifugal action, the relative proportion of solids other than butter fat has dropped, and for example, a seventy percent "super-cream" will have the following constituents:

| | Per cent |
|---|---|
| Butter fat | 70 |
| Solids other than butter fat | 3 |
| Liquids | 27 |

From the above it will be noted that the solids other than butter fat and the liquid vehicle remains approximately in the natural proportions.

The "super-cream" thus produced is then subjected to a squeezing or kneading pressure so that the butter globules are brought into close approximation to one another and joined together or coalesce to produce the butter. In other words, in cream, the butter fat is in the dispersed phase, and the liquids constitute the continuous phase: while in butter, the butter fat is the continuous phase, and the remaining liquids are distributed as the dispersed phase.

As a result of this squeezing or kneading, there is a reversal of the phase of the fat globules to the liquid vehicle and a formation of butter and therewith an initial squeezing out of a liquid in the form of buttermilk. That is, having initially produced a plastic cream of seventy percent butter fat, the kneading will cause the separation of ten or fifteen percent of the liquid ingredient, so that the final butter made from the seventy percent plastic cream may be as high as eighty or eighty-three percent in butter fat. The remainder of the vehicle is solids other than butter fat and the original liquid vehicle in approximately their natural proportions.

While I have described my process as the producing of butter from whole milk, it will be understood that separated cream produced in any way may be utilized as the basis from which the butter is produced. The essential steps of my process consist in the producing first of a plastic cream product having sixty-five percent or more butter fat dispersed in the original emulsion, and the kneading or squeezing of this plastic product thus obtained to produce directly therefrom the butter.

It will be obvious that the steps of this process may be operated intermittently, that is, the plastic cream product first produced, and later on, the step of producing the butter therefrom by squeezing or kneading. Then again, the process may be carried out as a continuous process, starting with fore-warming or heating the cream before the final separation; separating; cooling to form a plastic body; kneading or squeezing, causing the fat globules to coalesce, and disbursing the liquid vehicle as so-called buttermilk; continuing kneading or squeezing of this plastic form retaining product until the desired texture is obtained. It is, of course, understood that butter made by this process may be made with or without color, with or without salt, and with or without lactic acid, culture or "starter" for producing either a sweet or ripened cream butter. If color be used, it is preferably added before the final separation. If it is desired to use a starter, it is preferably added immediately after the final separation, with the cream still in the semi-fluid or liquid condition. If the product is to be the usual salted butter, it is preferably added immediately after sufficient kneading or squeezing of this plastic cream for dispersing moisture of the liquid vehicle as buttermilk.

If the butter is to be a pasteurized cream butter, the step of pasteurization is preferably carried out immediately prior to the final separation, with the cream remaining at a sufficiently high temperature to maintain the fat in liquid form during the final separation.

The economics of my process of making butter without churning are, of course, obvious, with respect to less net fat loss in the buttermilk; less expensive equipment in handling, power and labor, and the time necessary to produce a given quantity of butter. There is also a very obvious advantage that my process makes it possible to produce butter with much less opportunity for recontamination of the the cream after pasteurization.

It is obvious that minor changes in the steps of the process may be made without departing from the spirit of the invention as set forth in the appended claim.

Having thus described the invention, what I claim as new and desire to secure by Letters Patent, is—

The process of producing butter from milk consisting in forming therefrom a plastic cream containing not less than sixty-five percent of milk fat held in the natural dispersed phase in a liquid vehicle with the solids not fat and the original liquid vehicle retained in approximately their natural proportions, reversing the phase relation of the milk fat globules to the liquid vehicle by pressure applied directly to the plastic cream for transforming the cream into butter, removing a substantial portion of the liquid vehicle from the mass as it is formed, and continuing the application of pressure to the butter until the desired texture is obtained.

In testimony whereof, I affix my signature.

HERMAN D. WENDT.